April 3, 1962  W. C. WINTRODE ET AL  3,028,526
REACTANCE-TYPE FREQUENCY SENSITIVE BRIDGE
FOR SPEED SENSOR NETWORK
Filed Aug. 3, 1956

INVENTORS
WARNER C. WINTRODE
DAVID J. HARTMAN
BY-
ATTORNEY

# United States Patent Office 3,028,526
Patented Apr. 3, 1962

3,028,526
REACTANCE-TYPE FREQUENCY SENSITIVE
BRIDGE FOR SPEED SENSOR NETWORK
Warner C. Wintrode and David J. Hartman, South Bend, Ind., assignors to The Bendix Corporation, a corporation of Delaware
Filed Aug. 3, 1956, Ser. No. 601,953
4 Claims. (Cl. 317—5)

The present invention relates to speed governing systems and more particularly to an electrical speed governing system adapted for use in fuel control systems for gas turbine engines.

Where electrical speed governing systems are used in fuel control systems for gas turbine engines, particularly for aircraft, a great premium is placed on reliability coupled with small size and weight. It is, however, necessary that a governing system for gas turbine engines be highly accurate and quickly responsive. It is, therefore, an object of the present invention to provide an electrical speed governing system particularly adapted for use with electrical gas turbine engine control systems.

It is another object of the present invention to provide an electrical speed governing system which is very responsive and comparatively free from inaccuracies caused by drifting and changing of component values.

It is a further object to provide an electrical speed governing system which is rugged and which may be manufactured in a comparatively small and light package.

It is a further object to provide an electrical speed governing system in which the reference signal is derived from the same source as is the speed signal.

Figure 1:
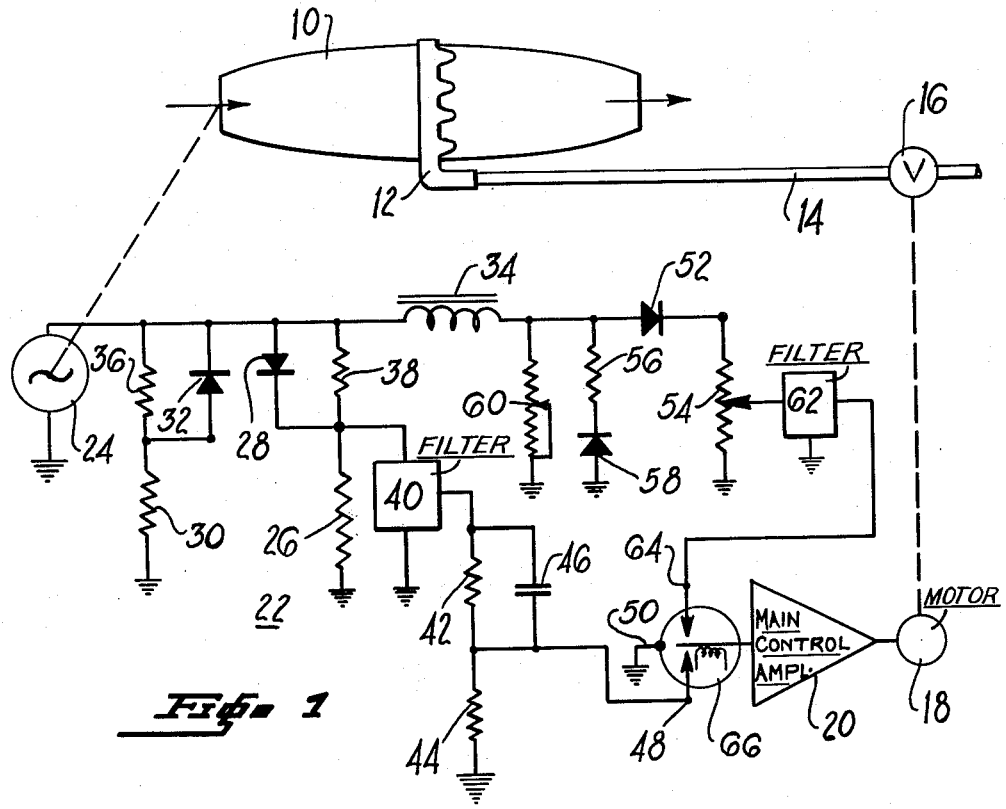
Figure 2:
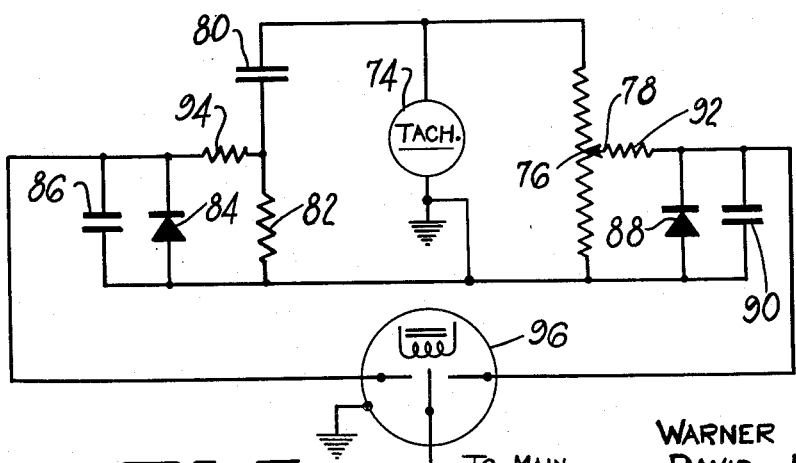

Other objects and advantages will become apparent from the following specification taken in connection with the accompanying drawings, in which:

FIGURE 1 shows our electrical speed governing system in conjunction with a gas turbine engine and associated control system; and FIGURE 2 shows an alternative form of our electrical speed governing system.

Referring to FIGURE 1, a gas turbine engine is shown generally at numeral 10 having a fuel manifold 12 which is supplied with fuel from a source, not shown, through a conduit 14. Flow through conduit 14 is controlled by means of a valve 16 positioned through the action of a motor 18. Actuation of motor 18 is controlled by an electrical main fuel control amplifier 20 which may be similar to that shown in copending application Serial No. 402,976, filed January 8, 1954 (common assignee). It is the function of our speed governing system, shown generally at numeral 22, to supply main control amplifier 20 with a speed error signal. This signal can be fed directly into the input terminal of the amplifier shown in FIGURE 4 of said Wintrode application.

A tachometer 24 is driven by the engine 10 at a speed directly proportional to that of the engine. The output of the tachometer, which varies directly in voltage and frequency with its speed, is applied an electrical bridge circuit including two primary branches, one of which is essentially resistive and the other of which is both reactive and resistive. With respect to the resistive branch, the output of tachometer 24 is impressed across a resistor 26 and a rectifier 28 and also across a parallel circuit containing a resistor 30 and a rectifier 32. Inasmuch as the rectifiers are connected in such manner as to pass current of opposite polarity, it follows that half of the alternating current cycle generated by tachometer 24 will appear in each of these circuits. The voltage appearing across resistor 26 is a pulsating direct current voltage varying in value directly with the speed of the tachometer 24. The primary function of the circuit containing resistor 30 and rectifier 32 is to provide an equivalent load on the negative half cycle of the tachometer output which prevents wave form distortion and saturation of the inductor 34. Resistors 36 and 38 are connected in parallel with rectifiers 32 and 28, respectively, for the purpose of balancing the back resistance of the rectifiers. The pulsating direct current voltage developed across resistor 26 is supplied as an input to a filter circuit shown generally at numeral 40. This filter circuit, which is a conventional LC design, is available commercially as a unit. The output of this filter circuit, which is essentially a smooth direct current voltage of a magnitude proportional to the speed of the engine 10, is developed across a pair of resistors 42 and 44. Connected in parallel with resistor 42 is a capacitor 46 which acts as a rate capacitor to provide a stabilizing or anti-hunting signal. The voltage developed between terminals 48 and 50 is a smooth direct current voltage of magnitude proportional to the speed of the tachometer 24 plus the rate of change of speed signal as developed across capacitor 46.

In the reactive-resistive branch of the governor system the alternating current output of tachometer 24 is impressed across the inductor 34 and through a number of resistance paths to ground. In series with inductor 34 is a rectifier 52 which rectifies the alternator output current thereby causing a pulsating direct current signal to be impressed across potentiometer 54. Also connected between inductor 34 and ground is a resistive branch containing a resistor 56 and a rectifier 58, said rectifier being connected in such manner as to pass current of opposite polarity to that passed by rectifier 52. With the structure as described, the current in the circuit containing resistor 56 and rectifier 58 is approximately equal to that in the circuit containing rectifier 52 and potentiometer 54 and the polarities are opposite. Each circuit, in effect, carries half of the alternator cycle. A third resistance path between inductor 34 and ground is supplied by means of a potentiometer 60. This branch is of comparatively high resistance and its only function is to slightly increase the load of the reactive-resistive branch to compensate for a somewhat increased reactance of inductor 34 caused by harmonics in the output of tachometer 34. Because of the fact that the reactance of inductor 34 increases directly with frequency and the fact that the reactive load of the inductor is many times greater than the resistive load in this branch, the current across potentiometer 54, and hence, its voltage drop, is substantially constant over most of the operating range of tachometer 24. This pulsating direct current signal of constant amplitude, which is selected by means of the slider on potentiometer 54, is impressed on a conventional filter circuit 62 which converts the pulsating direct current to a smooth direct current which is supplied to the terminal 64. The voltage as measured between point 64 and point 50 (ground) is a smooth direct current signal of constant amplitude, said amplitude being dependent upon the position of the slider on potentiometer 54. This potentiometer 54 is, then, the speed reference source or effectively, the throttle for the system. Terminals 48 and 64 are each connected to stationary contacts of a chopper 66 having a movable contact which is caused to move first against one stationary contact and then the other thereby effectively comparing the voltage at point 48 with that at point 64. As a result of this action, a speed error signal is supplied to the main control amplifier 20 which, in turn, uses this signal to control the speed of the gas turbine engine 10 in the manner described. It will be recognized that any of several well known summing or signal comparing circuit means may be used in place of chopper 66.

An alternative form of the invention is shown in FIGURE 2. In this figure only the actual governor structure has been shown and everything beyond the chopper may be considered to be the same as that of FIGURE 1.

This device may be considered to operate on the same broad general principle as the FIGURE 1 device, i.e., that where an alternating current voltage varying in frequency and magnitude is impressed across a highly reactive load, the reactance will tend to vary with the frequency in such manner as to effectively compensate for changes in voltage. In FIGURE 2, a tachometer 74 impresses an alternating current voltage varying in frequency and magnitude with the speed of the tachometer across the resistive side of a bridge containing a potentiometer 76 having a slider 78 and across the reactive side containing a capacitor 80 and a resistor 82. A rectifier 84 and a filter capacitor 86 are each connected in parallel with resistor 82 and with each other and a rectifier 88 and a filter capacitor 90 are connected in parallel with the portion of potentiometer 76 selected by the slider 78 which serves as a throttle. It is the function of each of rectifiers 84 and 88 to rectify the alternating current in its respective branch and the capacitors 86 and 90 filter the resulting pulsating direct current. A resistor 92 and a resistor 94 are each provided as current limiters for their respective branches. The outputs of each of the branches are supplied to the stationary contacts of the chopper 96 which compares the values and provides a speed error signal which is used by the main control system.

Operation of the FIGURE 2 device is very similar to that of FIGURE 1. It will be borne in mind, however, that the reactance across a capacitor decreases with increasing frequencies of the applied voltage while, in an inductor, the reactance increases with frequency of the applied voltage. In the device of FIGURE 2, assume a balanced condition where the tachometer speed is stable at a given value. A voltage of a definite frequency and magnitude is applied across potentiometer 76 and across capacitor 80 and resistor 82. The voltage drop across the selected portion of potentiometer 76 must equal the voltage drop across resistor 82; therefore, chopper 96 will be comparing two equal voltages and no error signal will be produced. Now assume a request for increased speed by means of moving slider 78 upward to select a greater voltage drop. The signal supplied to the right-hand contact of chopper 96 will be of greater magnitude than that on the left contact and an error signal will be produced which is of proper polarity to cause valve 16 to move in an opening direction. As the engine increases in speed due to the increased fuel flow, the tachometer will produce a voltage of progressively greater frequency and magnitude. This will cause an increase in the voltage drop across both the resistive and the reactive-resistive branches, but the voltage selected by means of the slider 78 will increase in an approximately linear relationship with the increase in speed. The voltage drop across the reactive-resistive branch, however, although increasing in total value in the same manner as that across the resistive branch, becomes divided disproportionately between capacitor 80 and resistor 82. As the frequency increases, the reactive drop across the capacitor becomes proportionately less, hence, the drop across resistor 82 must increase at a faster rate than the drop across the selected portion of potentiometer 76. At some speed point the voltage drop across resistor 82 will again balance that selected by slider 78 and the system will be in balance at the new request value.

While only two embodiments are shown and described herein, it is recognized that our invention may take a number of forms and modifications may be made to suit requirements.

We claim:

1. A system for controlling the speed of a rotating member comprising an electrically controlled speed adjusting means for said member, a tachometer-generator driven by said member producing an output varying in frequency and voltage with the speed of said member, a bridge circuit connected across said tachometer-generator having a resistive branch and a reactive-resistive branch, said resistive branch including a resistor and a rectifier connected across said tachometer-generator, a filter circuit, a voltage divider connected to said filter circuit, a stabilizing circuit connected to said filter circuit including a capacitor for producing a signal proportional to the rate of change of speed of said member; and said reactive-resistive branch including a reactor member, and a resistor member connected across said tachometer-generator, a rectifier in series with said resistor member, and means for selecting a desired proportion of voltage signal developed across said resistor member as an output signal, a chopper connected to the outputs of each of said resistive and reactive-resistive branches, and means connecting said chopper to said speed adjusting means for alternately connecting said outputs to said speed adjusting means.

2. A system for controlling the speed of a rotating member comprising an electrically controlled speed adjusting means for said member, means responsive to speed of said member for producing a signal varying in voltage and frequency with the speed of said member, a bridge circuit connected across said speed responsive means having a resistive branch and a reactive-resistive branch, said resistive branch including a resistor member and a rectifier connected across said speed responsive means, and said reactive-resistive branch including a reactance member and a resistor member connected across said speed responsive means, means for selecting a desired proportion of the voltage signal developed across one of said resistor members as a reference signal, means producing a speed error signal by comparing the outputs of said resistive and reactive-resistive branches, and means connecting said speed error signal producing means to said speed adjusting means.

3. A system for controlling the speed of a rotating member comprising an electrically controlled speed adjusting means for said member, means responsive to speed of said member for producing a signal varying in voltage and frequency with the speed of said member, a bridge circuit connected across said speed responsive means having a resistive branch and a reactive-resistive branch, said resistive branch including a resistor and a rectifier connected across said speed responsive means, and said reactive-resistive branch including a reactance member and a resistor member connected across said speed responsive means, a rectifier in series with said resistor member, means for selecting a desired proportion of the voltage signal developed across said resistor member as an output signal, and means producing a speed error signal by comparing the outputs of said resistive and reactive-resistive branches, and means connecting said comparing means to said speed adjusting means.

4. A system for controlling the speed of a rotating member comprising an electrically controlled speed adjusting means for said member, means responsive to speed of said member for producing a signal varying in voltage and frequency with the speed of said member, a bridge circuit connected across said speed responsive means having a resistive branch and a capacitive-resistive branch, said resistive branch including a resistor and a rectifier connected across said speed responsive means and said capacitive-resistive branch including a capacitor member and a resistor member connected across said speed responsive means, means for selecting a desired proportion of the voltage signal developed across one of said resistor members as a reference signal, means producing a speed error signal by comparing the outputs of said resistive and capacitive-resistive branches, and means connecting said comparing means to said speed adjusting means.

References Cited in the file of this patent

UNITED STATES PATENTS

| | | |
|---|---|---|
| 2,492,472 | Fortescue | Dec. 27, 1949 |
| 2,662,372 | Offner | Dec. 15, 1953 |
| 2,768,331 | Cetrone | Oct. 23, 1956 |
| 2,772,378 | Farkas | Nov. 27, 1956 |
| 2,827,910 | Wells | Mar. 25, 1958 |